United States Patent
Hii

(10) Patent No.: US 8,836,798 B2
(45) Date of Patent: Sep. 16, 2014

(54) METHOD AND SYSTEM FOR PROCESSING A COMPOSITE VIDEO IMAGE

(75) Inventor: Toh Onn Desmond Hii, Singapore (SG)

(73) Assignee: Creative Technology Ltd, Singapore (SG)

( * ) Notice: Subject to any disclaimer, the term of this patent is extended or adjusted under 35 U.S.C. 154(b) by 520 days.

(21) Appl. No.: 12/738,739

(22) PCT Filed: Oct. 15, 2008

(86) PCT No.: PCT/SG2008/000396
§ 371 (c)(1),
(2), (4) Date: Apr. 19, 2010

(87) PCT Pub. No.: WO2009/051566
PCT Pub. Date: Apr. 23, 2009

(65) Prior Publication Data
US 2010/0208139 A1 Aug. 19, 2010

(30) Foreign Application Priority Data

Oct. 19, 2007 (SG) .............................. 200717047-5

(51) Int. Cl.
*H04N 5/225* (2006.01)
*H04N 7/14* (2006.01)
*H04N 5/272* (2006.01)
*H04N 1/00* (2006.01)
*H04N 7/173* (2011.01)
*H04N 101/00* (2006.01)

(52) U.S. Cl.
CPC ............ *H04N 7/147* (2013.01); *H04N 2101/00* (2013.01); *H04N 2201/3267* (2013.01); *H04N 5/272* (2013.01); *H04N 2201/3276* (2013.01); *H04N 1/00347* (2013.01); *H04N 2201/3264* (2013.01)
USPC ......................................... 348/207.1; 725/105

(58) Field of Classification Search
USPC ........................................ 725/105; 348/207.1
See application file for complete search history.

(56) References Cited

U.S. PATENT DOCUMENTS

| | | | |
|---|---|---|---|
| 2002/0167595 A1* | 11/2002 | Patel et al. ................. | 348/211.3 |
| 2006/0132607 A1* | 6/2006 | Kimber et al. ............. | 348/207.1 |
| 2006/0187230 A1* | 8/2006 | Jung et al. .................... | 345/581 |
| 2006/0284981 A1* | 12/2006 | Erol et al. .................. | 348/207.1 |
| 2007/0022455 A1* | 1/2007 | Endou et al. .................. | 725/105 |
| 2007/0040897 A1* | 2/2007 | Kawada et al. ............ | 348/14.07 |
| 2007/0285503 A1* | 12/2007 | Asthana et al. ............ | 348/14.08 |
| 2009/0073267 A1* | 3/2009 | Denoue et al. ............. | 348/207.1 |

* cited by examiner

*Primary Examiner* — Sinh Tran
*Assistant Examiner* — Christopher K Peterson
(74) *Attorney, Agent, or Firm* — Russell Swerdon; Desmund Gean

(57) ABSTRACT

There are provided methods and systems for processing a composite video image. The composite video image may be a combination of an image and at least one encoded screen capture at a communications apparatus either by a user or in accordance to pre-determined settings for the user's consumption and transmission to a network. Transmission to a network may be simultaneous during the user's consumption. It is advantageous that encoding of the at least one screen capture is independent of at least one application running on the at least one secondary device. It is possible that the at least one screen capture may or may not have audio signals.

20 Claims, 5 Drawing Sheets

METHOD AND SYSTEM FOR PROCESSING A COMPOSITE VIDEO IMAGE

FIELD OF INVENTION

The present invention relates generally to the field of processing a composite video image comprising content from multiple sources, particularly, though not exclusively, to a method and system which is independent of platform and application.

BACKGROUND

Increasing bandwidths for data transmission, decreasing data transmission costs and the ubiquitous presence of VOIP are some factors which have led to a surge in the adoption of video conferencing as a communication tool. This surge has led to a proliferation of an increasing variety of devices which are used specifically for video conferencing, such devices being akin to a telephone with video conferencing functionality. However, these devices which are used specifically for video conferencing may be designed primarily for ease of use for users of varying levels of technological aptitude. This need for devices which are easy to use has led to simplification of such devices in relation to the functionality of the devices.

Limiting the functionality of the devices usually simplifies usability of the device. In this instance, the devices are generally only required to transmit and receive video signals to enable video conferencing. It would be difficult for a user of the device to show to a recipient content displayed on at least one secondary device such as, for example, a computer, a PDA, a mobile phone, a portable games console and a television tuner. Using a digital camera of the device to capture the content displayed on the secondary device would give rise to undesirable issues for the recipient because of, for example, refresh rate issues, image quality/sharpness issues, resolution issues and the like. The camera may not be able to capture the content clearly because of the distance from the secondary device to the camera. Porting content from the secondary device may also require data processing capability which the simplified device is not able to facilitate.

SUMMARY

In a first aspect, there is provided a method for processing a composite video image. The method includes obtaining an image using an image capturing device of a communications apparatus; obtaining at least one screen capture from at least one secondary device connected to the communications apparatus; encoding the at least one screen capture at the at least one secondary device into a format receivable by the communications apparatus; transmitting the at least one encoded screen capture to the communications apparatus; decoding the at least one encoded screen capture at the communications apparatus; and composing the composite video image of a combination of the image and the at least one encoded screen capture at the communications apparatus either by a user or in accordance to pre-determined settings for the user's consumption and transmission to a network. Transmission to a network may be simultaneous during the user's consumption. It is advantageous that encoding of the at least one screen capture is independent of at least one application running on the at least one secondary device. It is possible that the at least one screen capture may or may not have audio signals.

The at least one screen capture may be either a full screen view or a partial screen view. It is preferable that the at least one encoded screen capture is transmitted as a sequential stream. Either variation or loss of a source of the at least one screen capture may cause variation in the composite video image. Preferably, the composite video image includes the at least one encoded screen capture as a background and the image overlaid on the at least one encoded screen capture.

The at least one secondary device may be, for example, a media player, a computer, a PDA, a mobile phone, a portable games console, a camera or a television tuner.

In a second aspect, there is provided another method for processing a composite video image. The method includes obtaining an image using an image capturing device of a communications apparatus; obtaining at least one screen capture from at least one secondary device connected to the communications apparatus; encoding the at least one screen capture at the at least one secondary device into a format receivable by the communications apparatus; transmitting the at least one encoded screen capture to the communications apparatus; decoding the at least one encoded screen capture at the communications apparatus; and transmitting a plurality of data streams to a server, the server composing the composite video image of a combination of the image and the at least one encoded screen capture at the communications apparatus either by a user or in accordance to pre-determined settings for the user's consumption and further transmission to a network. The further transmission to a network may be simultaneous during the user's consumption. It is advantageous that encoding of the at least one screen capture is independent of at least one application running on the at least one secondary device. It is possible that the at least one screen capture may or may not have audio signals.

The at least one screen capture may be either a full screen view or a partial screen view. It is preferable that the at least one encoded screen capture is transmitted as a sequential stream. Either variation or loss of a source of the at least one screen capture may cause variation in the composite video image. Preferably, the composite video image includes the at least one encoded screen capture as a background and the image overlaid on the at least one encoded screen capture.

In a third aspect, there is provided a system for processing a composite video image. The system includes an image capturing device of a communications apparatus for obtaining an image; at least one secondary device connected to the communications apparatus for obtaining at least one screen capture; a bridging encoder in the at least one secondary device for converting the at least one screen capture into a format receivable by the communications apparatus; a transmitter coupled to the bridging encoder in the at least one secondary device for transmitting the at least one encoded screen capture to a bridging decoder of the communications apparatus; a video composer coupled to the bridging decoder, the video composer controlled either by a user or in accordance to pre-determined settings in the communications apparatus for composing the composite video image of a combination of the image and the at least one encoded screen capture for the user's consumption and further transmission to a network. It is advantageous that encoding of the at least one screen capture is independent of at least one application running on the at least one secondary device. The at least one screen capture may or may not have audio signals.

The at least one screen capture may be either a full screen view or a partial screen view. It is preferable that the at least one encoded screen capture is transmitted as a sequential stream. Either variation or loss of a source of the at least one screen capture may cause variation in the composite video image. Preferably, the composite video image includes the at least one encoded screen capture as a background and the image overlaid on the at least one encoded screen capture.

The at least one secondary device may be, for example, a media player, a computer, a PDA, a mobile phone, a portable games console, a camera or a television tuner.

In a final aspect, there is provided another system for processing a composite video image. The system includes an image capturing device of a communications apparatus for obtaining an image; at least one secondary device connected to the communications apparatus for obtaining at least one screen capture; a bridging encoder in the at least one secondary device for converting the at least one screen capture into a format receivable by the communications apparatus; a transmitter coupled to the bridging encoder in the at least one secondary device for transmitting the at least one encoded screen capture to a bridging decoder of the communications apparatus; a video composer hosted on a server connectable to the communications apparatus, the video composer controlled either by a user or in accordance to pre-determined settings in the communications apparatus for composing the composite video image of a combination of the image and the at least one encoded screen capture for the users consumption and further transmission to a network. It is advantageous that encoding of the at least one screen capture is independent of at least one application running on the at least one secondary device.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
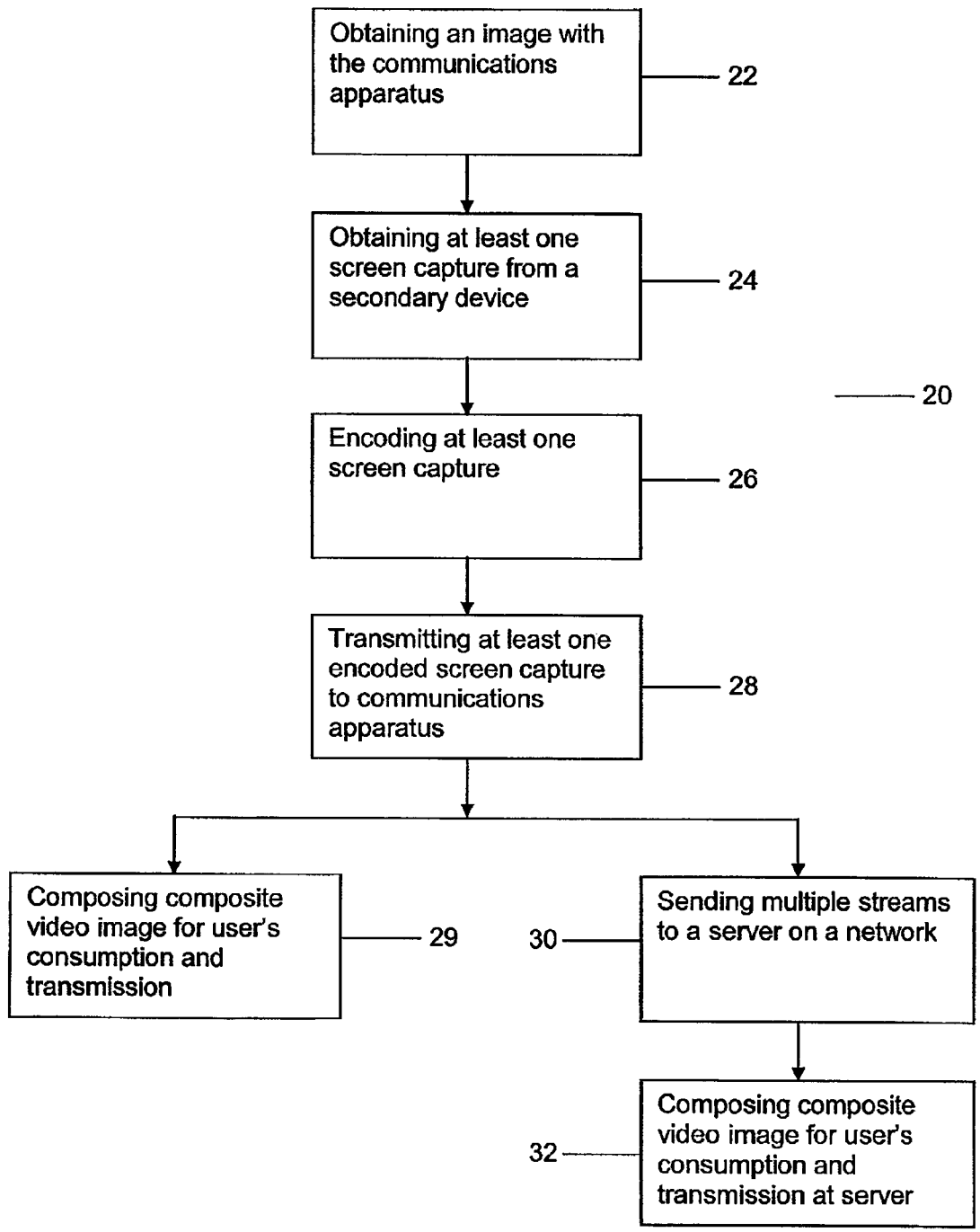
FIG. 1 shows a flow chart for a method of the present invention in a first embodiment.
Figure 6:
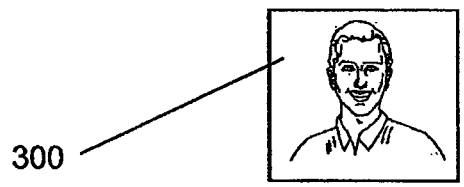
FIG. 6 shows an example of an image obtained using an image capturing device of a communications apparatus.
Figure 7:
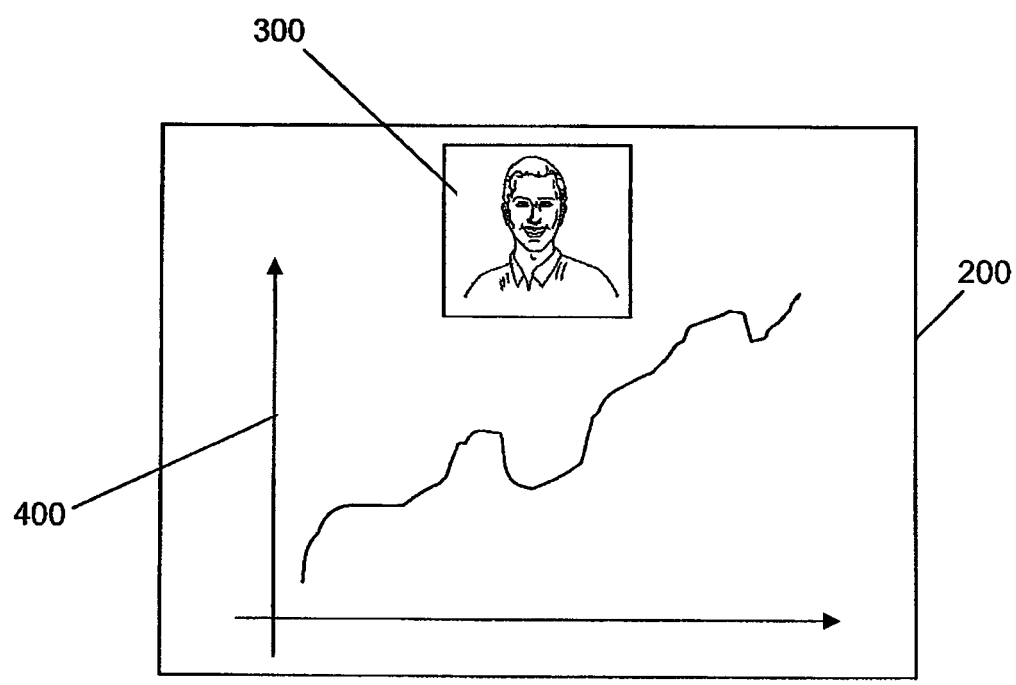
FIG. 7 shows an example of a composite video image obtained using a method and/or system of the present invention.

In a first aspect as shown in FIG. 1, there is provided a method 20 for processing a composite video image (an example of such a composite image 200 is shown in FIG. 7). The method 20 includes obtaining an image (an example of such an image 300 is shown in FIG. 6) using an image capturing device of a communications apparatus (22). The communications apparatus may be represented schematically as 50 in FIGS. 2 and 70 in FIGS. 3. 50 and 70 represent variations of the communications apparatus. FIG. 4 also shows a representation of the communications apparatus 100 during use.

Figure 5:
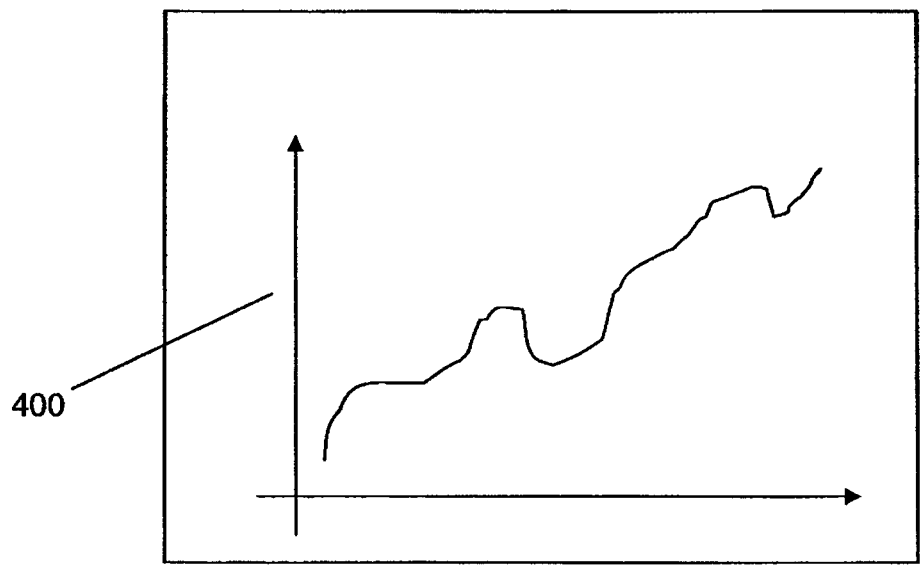
FIG. 5 shows an example of a screen capture.

The method 20 includes obtaining at least one screen capture (an example of such a screen capture 400 is shown in FIG. 5) from at least one secondary device connected to the communications apparatus (24). The screen capture may include, for example, graphs, charts, presentation slides, still images, moving images, and so forth. The at least one secondary device may be, for example, a media player, a computer, a PDA, a mobile phone, a portable games console, a television tuner, camera and the like. The secondary device may be represented schematically as 40 in FIG. 2 and FIG. 3. FIG. 5 also shows illustrative representations of the secondary device, namely notebook 120, mobile phone 140, portable games console 160, television tuner in television 180. The connection to the communications apparatus may be either via a cable or a wireless connection. The at least one screen capture may be encoded at the at least one secondary device into a format for transmission to the communications apparatus (26). The at least one screen capture may also undergo compression during encoding at the at least one secondary device. Audio signals may also be captured at the at least one secondary device.

The at least one encoded screen capture may then be transmitted as a sequential stream to the communications apparatus (28) via the connection to the communications apparatus. Similarly, the audio signals may also be transmitted to the communications apparatus.

The at least one encoded screen capture (and audio signals) and the image obtained using the image capturing device may then be decoded, combined and composed into a composite video image (29). The composition of the composite image may depend on either a user or in accordance to pre-determined settings. For example, the user may prefer to use the screen capture as a background of the composite video image with the image being overlaid on the at least one encoded screen capture. This is shown in the composite image 200 in FIG. 7. A source of the at least one encoded screen capture may be varied at any instance. When the source of the at least one encoded screen capture is varied, the at least one encoded screen capture may have different content, and the composite video image is presented subsequently with the different content. The at least one screen capture may be either a full screen view or a partial screen view. The pre-determined settings may include settings in relation to audio mixing, positioning the image/screen capture individually or relative to one another and so forth. The composite image may be used for the user's consumption (previewing the composite image) and transmission to a network. The transmission to the network may be simultaneous during the user's consumption. It should be noted that user's consumption may include, for example, viewing, and editing. The composite image may be encoded and compressed prior to transmission to the network.

Subsequent to the sequential transmission of the at least one encoded screen capture (and audio signals) to the communications apparatus (28), the communications apparatus may alternatively transmit the at least one encoded screen capture (and audio signals) and the image obtained using the image capturing device as separate streams (30) to the network. The separate streams may be decoded, combined and composed into a composite video image on a server connected to the network (32). The composition of the composite image may depend on either a user or in accordance to pre-determined settings. A source of the at least one encoded screen capture may be varied at any instance. When the source of the at least one encoded screen capture is varied, the at least one encoded screen capture may have different content (and audio), and the composite video image is presented subsequently with the different content. The composite video image may also be presented differently when one or more of the secondary devices are disconnected from the communications apparatus. The pre-determined settings may allow for loss of a source of the encoded screen capture without causing any disruption to the user during communication with other parties. The at least one screen capture may be either a full screen view or a partial screen view. The pre-determined settings may include settings in relation to positioning the image/screen capture individually or relative to one another. The composite image may be used for the user's consumption and transmission to a network. The transmission to the network from the server may be simultaneous during the user's consumption. The composite image may be encoded and compressed prior to transmission to the network.

The screen capture, encoding and transmission steps of the method 20 may be enabled in the communications apparatus by a set of instructions running on, for example, an ActiveX client, Java or a proprietary application. In this regard, the set of instructions, ie the ActiveX client, the Java applet/application or the proprietary application may reside locally on the communications apparatus. It should be noted that the communications apparatus may be a USB mass storage device such that the secondary device is able to download the set of instructions for execution without the user's intervention. The communications apparatus may also act as a web server. The communications apparatus may also perform a role as a web server. It is advantageous that the method 20 is independent of at least one application running on the at least one secondary device. As such, the method 20 may still be performed when the at least one application is enhanced/upgraded/updated. Thus, the method 20 is enabled regardless of operating system on the secondary device, application on the secondary device and application version on the secondary device. Use of widely adopted file formats for transmission such as, for example, jpg, mp4, mp3 and so forth may further aid in enabling the method 20 to be enabled regardless of operating system on the secondary device, application on the secondary device and application version on the secondary device.

Figure 2:
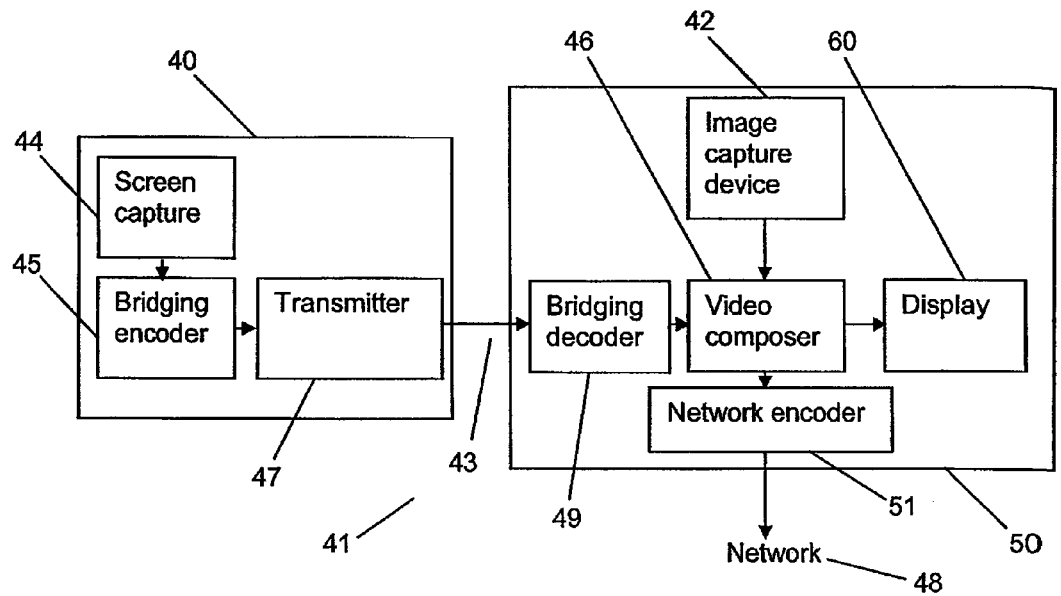
FIG. 2 shows a schematic diagram for a system of the present invention in a first embodiment.

In a second aspect, there is disclosed in FIG. 2, a system 41 for processing a composite video image (an example of such a composite image 200 is shown in FIG. 7). The system 41 includes an image capturing device 42 of a communications apparatus 50 for obtaining an image (an example of such an image 300 is shown in FIG. 6). At least one secondary device 40 may be connected 43 to the communications apparatus 50 for obtaining at least one screen capture 44 (an example of such a screen capture 400 is shown in FIG. 5). The screen capture may include, for example, graphs, charts, presentation slides, still images, moving images, and so forth. Audio signals may also be captured at the at least one secondary device. The at least one secondary device 40 may be, for example, a media player, a computer, a PDA, a mobile phone, a portable games console, a television tuner, camera and the like. FIG. 4 also shows illustrative representations of the secondary device, namely notebook 120, mobile phone 140, portable games console 160, television tuner in television 180.

The at least one secondary device 40 may include a bridging encoder 45 for converting the at least one screen capture 44 (and audio signals) into a format for transmission to the communications apparatus 50. The bridging encoder 45 may also compress the at least one screen capture 44. The at least one secondary device 40 may include a transmitter 47 for transmitting the at least one encoded screen capture (and audio signals) to a bridging decoder 49 and subsequently to a video composer 46 of the communications apparatus 50 in a sequential stream.

The video composer 46 may be controlled either by a user or in accordance to pre-determined settings. For example, the user may prefer to use the screen capture as a background of the composite video image with the image being overlaid on the at least one encoded screen capture. This is shown in the composite image 200 in FIG. 7. A source of the at least one screen capture 44 (and audio signals) may be varied at any instance. When the source of the at least one screen capture (and audio signals) is varied, the at least one encoded screen capture may have different content, and the video composer 46 correspondingly presents the composite video image with the different content. The composite video image may also be presented differently when one or more of the secondary devices 40 are disconnected from the communications apparatus 50. The pre-determined settings may allow for loss of a source of the encoded screen capture without causing any disruption to the user during communication with other parties. The pre-determined settings may include settings in relation to audio mixing, positioning the image/screen capture individually or relative to one another and so forth. The at least one screen capture may be either a full screen view or a partial screen view. The composite image may be used for the user's consumption on a display 60 and transmission to a network 48. The transmission to the network 48 may be simultaneous during the user's consumption. It should be noted that user's consumption may include, for example, viewing, and editing. The composite image may be encoded and compressed by a network encoder 51 prior to transmission to the network.

Figure 3:
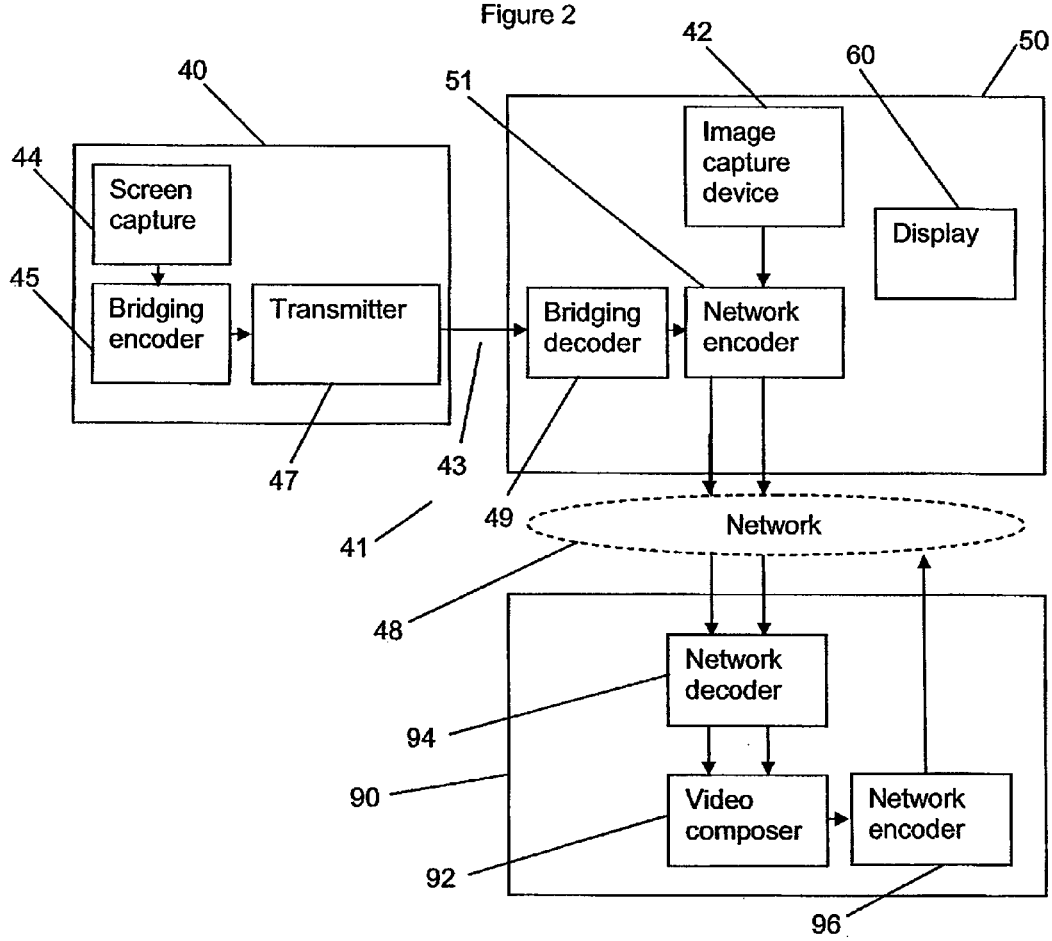
FIG. 3 shows a schematic diagram for a system of the present invention in a variation of the first embodiment.
Figure 4:
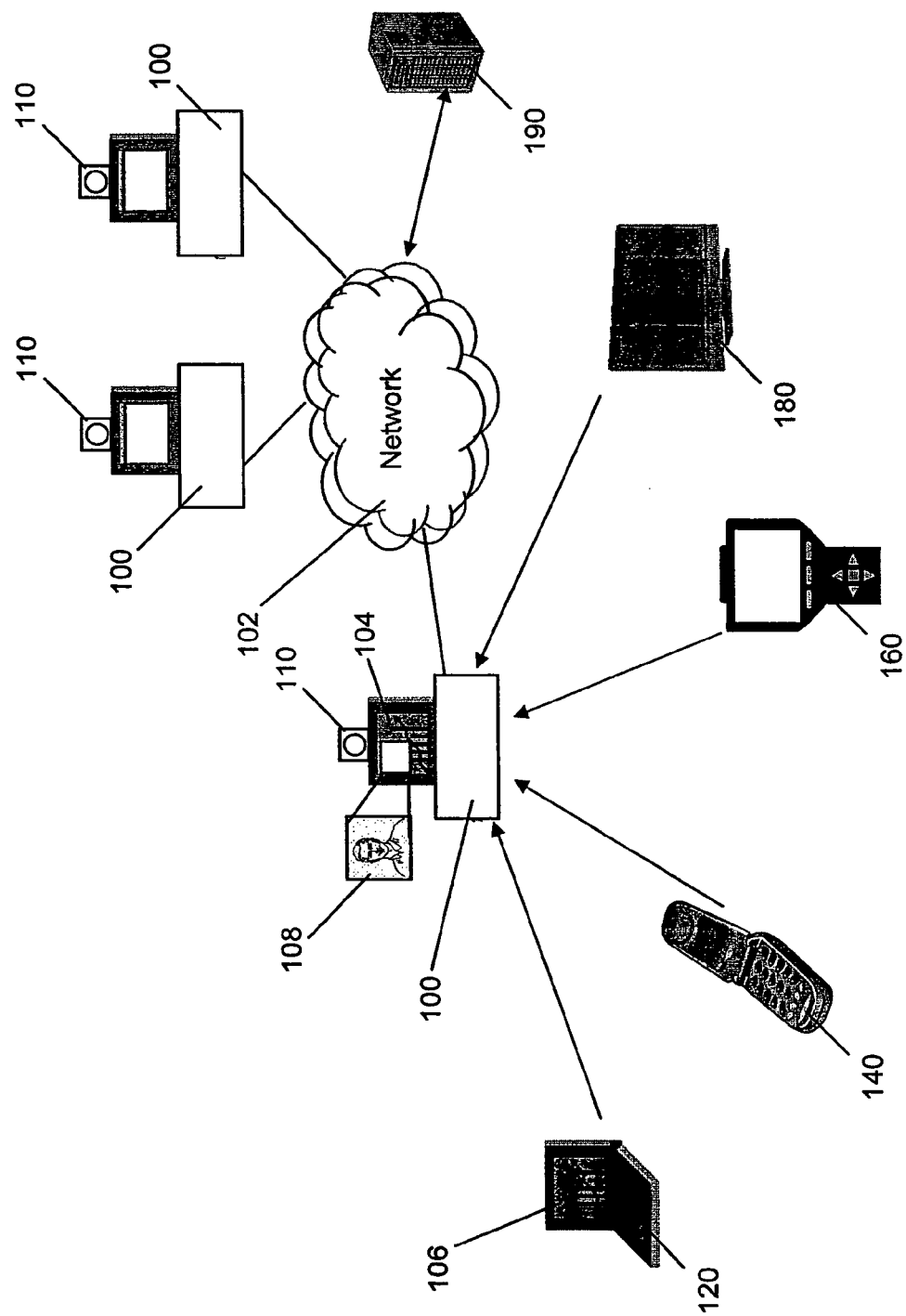
FIG. 4 shows an overview of the system of the present invention.

A variation of the second aspect of the system 41 is shown in FIG. 3. In this variation, the communications apparatus 70 lacks a video composer. The communications apparatus 70 may transmit the at least one encoded screen capture (and audio signals) and the image obtained using the image capturing device as separate streams to the network 48. The separate streams may be combined and composed into a composite video image by a video composer 92 of a server 90 connected to the network 48. The server 90 may include a network decoder 94 to decode signals from the network 48. The video composer 92 may be controlled either by a user or in accordance to pre-determined settings. For example, the user may prefer to use the screen capture as a background of the composite video image with the image being overlaid on the at least one encoded screen capture. A source of the at least one screen capture 44 may be varied at any instance. When the source of the at least one screen capture is varied, the at least one encoded screen capture may have different content, and the video composer 92 correspondingly presents the composite video image with the different content (and audio). The pre-determined settings may include settings in relation to audio mixing, positioning the image/screen capture individually or relative to one another and so forth. The at least one screen capture may be either a full screen view or a partial screen view. The composite image may be used for the user's consumption on a display 60 and transmission to a network 48. The transmission to the network 48 may be simultaneous during the user's consumption. The composite image may be encoded and compressed by a network encoder 96 prior to transmission to the network 48.

In the system 41, it is advantageous that encoding of the at least one screen capture is independent of at least one application running on the at least one secondary device. The screen capture, encoding and transmission steps of the system 41 may be enabled by an ActiveX client, Java or a proprietary application. In this regard, the set of instructions, ie the ActiveX client, the Java applet/application or the proprietary application may reside locally on the communications apparatus 70. It should be noted that the communications apparatus 70 may be a USB mass storage device such that the secondary device 40 is able to download the set of instructions for execution without the user's intervention. The communications apparatus 70 may also act as a web server. As such, encoding may still be performed when the at least one application is enhanced/upgraded/updated. Thus, encoding is enabled regardless of operating system on the secondary device, application on the secondary device and application version on the secondary device. Use of widely adopted file formats for transmission such as, for example, jpg, mp4, mp3 and so forth may further aid in enabling the method 30 to be enabled regardless of operating system on the secondary device, application on the secondary device and application version on the secondary device.

Referring to FIG. 3, there is shown an overview of the system of the present invention. A communication apparatus 100 is shown to be connected to a plurality of similar communication apparatus 100 over a network 102. The network 102 may be a local area network or a wide area network. It should be noted that the communication apparatus 100 may be an apparatus with less data processing power than a computer of a same era. An essential aspect of the system relates to the communication apparatus 100 being able to be connected to secondary devices regardless of operating system on the secondary device, application on the secondary device and application version on the secondary device. It can be seen that secondary devices, such as, for example, a notebook 120, a mobile phone 140, a portable games console 160, a television tuner in a television 180 and the like are connected to the communication apparatus 100. A display 104 of the communication apparatus 100 shows a composite image comprising a screen capture 106 from the notebook 120 and an image 108 obtained by an image capturing device 110 of the communications apparatus 100. A server 190 is shown to be connected to the network 102, as per the description of the variation of the system 41.

Whilst there has been described in the foregoing description preferred embodiments of the present invention, it will be understood by those skilled in the technology concerned that many variations or modifications in details of design or construction may be made without departing from the present invention.

The invention claimed is:

1. A method for processing a composite video image, the method including:
    obtaining an image using an image capturing device of a communications apparatus;
    obtaining at least one screen capture from at least one secondary device connected to the communications apparatus;
    encoding the at least one screen capture at the at least one secondary device into a format receivable by the communications apparatus;
    transmitting the at least one encoded screen capture to the communications apparatus;
    decoding the at least one encoded screen capture at the communications apparatus;
    composing the composite video image of a combination of the image and the at least one encoded screen capture at the communications apparatus either by a user or in accordance to pre-determined settings for the user's consumption; and
    transmitting the composed composite video image to a network,
    wherein encoding of the at least one screen capture is capable of being enabled in the communications apparatus by a set of instructions residing locally in the communications apparatus in a manner such that encoding of the at least one screen capture is independent of at least one application running on the at least one secondary device, and
    wherein the at least one screen capture is of the type selected from the group consisting of: with audio signals and without audio signals.

2. The method as claimed in claim 1, wherein the at least one screen capture is of either a full screen view or a partial screen view.

3. The method as claimed in claim 1, wherein the transmission to a network is simultaneous during the user's consumption.

4. The method as claimed in claim 1, wherein the at least one encoded screen capture is transmitted as a sequential stream.

5. The method as claimed in claim 1, wherein the at least one secondary device is selected from the group consisting of: a media player, a computer, a PDA, a mobile phone, a portable games console, a camera and a television tuner.

6. The method as claimed in claim 1, the method further including:
    transmitting a plurality of data streams to a server, wherein the server performs the composing step.

7. The method as claimed in claim 6, wherein the at least one screen capture is of either a full screen view or a partial screen view.

8. The method as claimed in claim 6, wherein the further transmission to a network is simultaneous during the user's consumption.

9. The method as claimed in claim 6, wherein the composite video image includes the at least one encoded screen capture as a background and the image overlaid on the at least one encoded screen capture.

10. The method as claimed in claim 6, wherein either variation or loss of a source of the at least one screen capture causes variation in the composite video image.

11. A system for processing a composite video image, the system including:
    an image capturing device of a communications apparatus for obtaining an image;
    at least one secondary device connected to the communications apparatus for obtaining at least one screen capture;
    a bridging encoder in the at least one secondary device for converting the at least one screen capture into a format receivable by the communications apparatus;
    a transmitter coupled to the bridging encoder in the at least one secondary device for transmitting the at least one encoded screen capture to a bridging decoder of the communications apparatus;
    a video composer coupled to the bridging decoder, the video composer controlled either by a user or in accordance to pre-determined settings in the communications apparatus for composing the composite video image of a combination of the image and the at least one encoded screen capture for the user's consumption and for transmitting the composed composite video image to a network,
    wherein encoding of the at least one screen capture is capable of being enabled in the communications apparatus by a set of instructions residing locally in the communications apparatus in a manner such that encoding of the at least one screen capture is independent of at least one application running on the at least one secondary device, and wherein the at least one screen capture is of the type selected from the group consisting of: with audio signals and without audio signals.

12. The system as claimed in claim 11, wherein the at least one encoded screen capture is transmitted as a sequential stream.

13. The system as claimed in claim 11, wherein the at least one secondary device is selected from the group consisting of: a media player, a computer, a PDA, a mobile phone, a portable games console, a camera and a television tuner.

14. The system as claimed in claim 11, wherein the composite video image includes the at least one encoded screen capture as a background and the image overlaid on the at least one encoded screen capture.

15. The system as claimed in claim 11, wherein either variation or loss of a source of the at least one screen capture causes variation in the composite video image.

16. The system as claimed in claim 11, wherein the video composer is hosted on a server connectable to the communications apparatus.

17. The system as claimed in claim 16, wherein the at least one screen capture is of either a full screen view or a partial screen view.

18. The system as claimed in claim 16, wherein the further transmission to a network is simultaneous during the user's consumption.

19. The system as claimed in claim 16, wherein the at least one encoded screen capture is transmitted as a sequential stream.

20. The system as claimed in claim 16, wherein the at least one secondary device is selected from the group consisting of: a media player, a computer, a PDA, a mobile phone, a portable games console, a camera and a television tuner.

* * * * *